(12) United States Patent
Zhang (10) Patent No.: US 11,366,224 B2
(45) Date of Patent: Jun. 21, 2022

(54) PROXIMITY SENSOR AND ELECTRONIC DEVICE

(71) Applicant: GUANGDONG OPPO MOBILE TELECOMMUNICATIONS CORP., LTD., Guangdong (CN)

(72) Inventor: Haiping Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/176,805

(22) Filed: Feb. 16, 2021

(65) Prior Publication Data

US 2021/0173082 A1 Jun. 10, 2021

Related U.S. Application Data

(63) Continuation of application No. PCT/CN2019/088580, filed on May 27, 2019.

(30) Foreign Application Priority Data

Aug. 21, 2018 (CN) .......................... 201810952376.0

(51) Int. Cl.
*G06F 3/042* (2006.01)
*G01S 17/08* (2006.01)
*G06F 3/041* (2006.01)

(52) U.S. Cl.
CPC .............. *G01S 17/08* (2013.01); *G06F 3/041* (2013.01)

(58) Field of Classification Search
None
See application file for complete search history.

(56) References Cited

U.S. PATENT DOCUMENTS

| 9,664,555 B2 | 5/2017 | Shiu et al. |
| 2011/0297831 A1 | 12/2011 | Yao et al. |

(Continued)

FOREIGN PATENT DOCUMENTS

| CN | 101936506 A | 1/2011 |
| CN | 202548325 U | 11/2012 |

(Continued)

OTHER PUBLICATIONS

Chinese First office action with English Translation for Chinese application No. 201810952376.0, dated Dec. 12, 2019 (17 pages).

(Continued)

*Primary Examiner* — Carl Adams
(74) *Attorney, Agent, or Firm* — Young Basile Hanlon & MacFarlane, P.C.

(57) ABSTRACT

A proximity sensor and an electronic device. The proximity sensor includes a circuit board; an infrared emitter and an infrared receiver both arranged on the circuit board, wherein the infrared emitter includes a light emitting source arranged on the circuit board and a light transmitting element covering the light emitting source; the light emitting source has an emission optical axis, the light transmitting element includes a front light transmitting portion and a rear light transmitting portion connected to the front light transmitting portion; the front light transmitting portion is located on a front side of the emission light axis of the light emitting source, and the rear light transmitting portion is located on a rear side of the emission light axis of the light emitting source; and the infrared receiver is located on one side of the light emitting source; and a light shielding element, wherein the light shielding element covers at least a part of the rear light transmitting portion.

20 Claims, 11 Drawing Sheets

(56) References Cited

U.S. PATENT DOCUMENTS

| | | | |
|---|---|---|---|
| 2012/0224187 A1* | 9/2012 | D'Souza | G06F 3/0423 |
| | | | 356/614 |
| 2014/0231635 A1 | 8/2014 | Kerness et al. | |
| 2015/0190094 A1* | 7/2015 | Lee | A61B 5/742 |
| | | | 600/479 |
| 2017/0345961 A1 | 11/2017 | Shentu et al. | |

FOREIGN PATENT DOCUMENTS

| | | |
|---|---|---|
| CN | 106055178 A | 10/2016 |
| CN | 106664111 A | 5/2017 |
| CN | 206442424 U | 8/2017 |
| CN | 107493357 A | 12/2017 |
| CN | 107948422 A | 4/2018 |
| CN | 109032433 A | 12/2018 |
| EP | 3023809 A1 | 5/2016 |

OTHER PUBLICATIONS

Chinese second office action with English Translation for Chinese application No. 201810952376., dated Apr. 10, 2020(12 pages).
Notification to Grant Patent Right for Invention with English Translation for Chinese application No. 201810952376., dated Aug. 6, 2020 (6 pages).
International Search Report with English Translation for International application No. PCT/CN2019/088580, dated Sep. 3, 2019 (14 pages).
Extended European Search Report for EP Application 19851952.2 dated Sep. 23, 2021. (7 pages).

\* cited by examiner

PROXIMITY SENSOR AND ELECTRONIC DEVICE

CROSS-REFERENCE TO RELATED APPLICATION(S)

The present application is a continuation-application of International (PCT) Patent Application No. PCT/CN2019/088580, filed on May 27, 2019, which claims priority of Chinese Patent Application No. 201810952376.0, filed on Aug. 21, 2018, the entire contents of both of which are hereby incorporated by reference.

TECHNICAL FIELD

The present disclosure relates to the field of electronic devices, and in particular, to a proximity sensor and an electronic device.

BACKGROUND

In an electronic device such as a mobile phone, the electronic device is arranged with a proximity sensor, such that a processor of the electronic device may control a display state of a display of the electronic device according to a signal of the proximity sensor. Therefore, it has become a focus of attention how to improve a detection capability of the proximity sensor to accurately control the display state of the display.

SUMMARY

The present disclosure provides a proximity sensor and an electronic device.

The proximity sensor includes: a circuit board; an infrared emitter and an infrared receiver, both arranged on the circuit board, and a light shielding element covering at least a part of the rear light transmitting portion. The light emitting source has an emission optical axis. The infrared emitter includes a light emitting source arranged on the circuit board and a light transmitting element covering the light emitting source. The infrared receiver is arranged on a side of the light emitting source. The light transmitting element includes a front light transmitting portion and a rear light transmitting portion connected to the front light transmitting portion, the front light transmitting portion being located on a front side of the emission optical axis of the light emitting source, the rear light transmitting portion being located on a rear side of the emission optical axis of the light emitting source.

The electronic device includes a housing, and a proximity sensor arranged in the housing. The proximity sensor is as described above.

BRIEF DESCRIPTION OF DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

EXPLANATION OF MAIN COMPONENT SYMBOLS electronic device 100, object 200;
housing 10, substrate 12, acoustic channel 122, surrounding wall 14, light through hole 142, axis 1422 of the light through hole 142, first opening 1424, second opening 1426, outer side surface 144, receiving space 16;
touch display 20, display 21, cover plate 22;
proximity sensor 30, emission optical axis 31, circuit board 32, groove 321, infrared emitter 33, light emitting source 331, light transmitting element 332, front light transmitting portion 3321, rear light transmitting portion 3322, infrared receiver 34, light shielding element 35, cover 36, top plate 361, through hole 3611, side plate 362, light blocking plate 363;
processor 40, light guide 50, top surface 52;
light transmitting body 60, electro-acoustic element 70.

DETAILED DESCRIPTION

The embodiments of the present disclosure are described in detail below. Examples of the embodiments are shown in the drawings. Same or similar reference numerals represent same or similar elements or elements having same or similar functions throughout. The embodiments described below with reference to the drawings are exemplary and are only for explaining the present disclosure, and should not be construed as limiting the present disclosure.

The following disclosure provides many different implementations or examples for implementing different structures of the present disclosure. To simplify the disclosure of the present disclosure, components and settings of specific examples are described below. Of course, they are merely examples and are not intended to limit the present disclosure. In addition, the present disclosure may repeat reference numbers and/or reference letters in different examples, and such repetition is for the purpose of simplicity and clarity, and does not indicate the relationship between the various embodiments and/or settings discussed. In addition, examples of various specific processes and materials are provided in the present disclosure, but those skilled in the art can be aware of the application of other processes and/or the usage of other materials.

Figure 1:
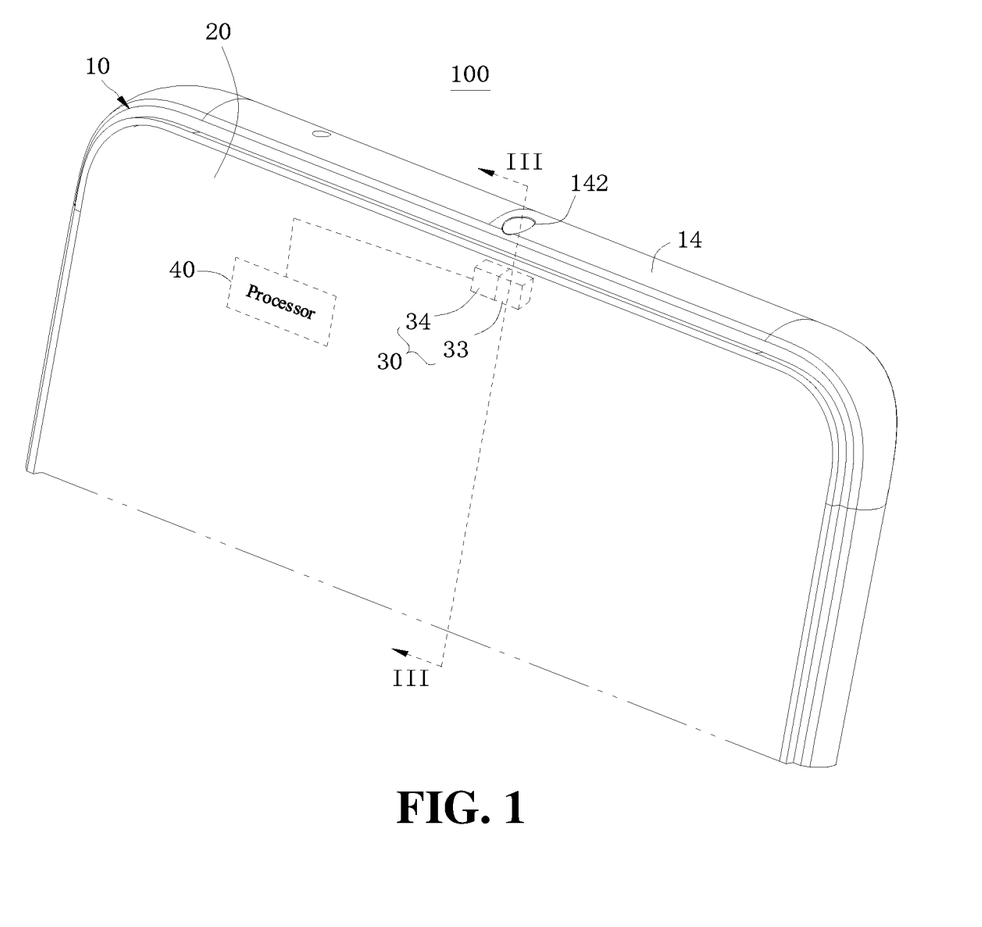
FIG. 1 is a schematic partial perspective view of an electronic device according to an embodiment of the present disclosure.
Figure 2:
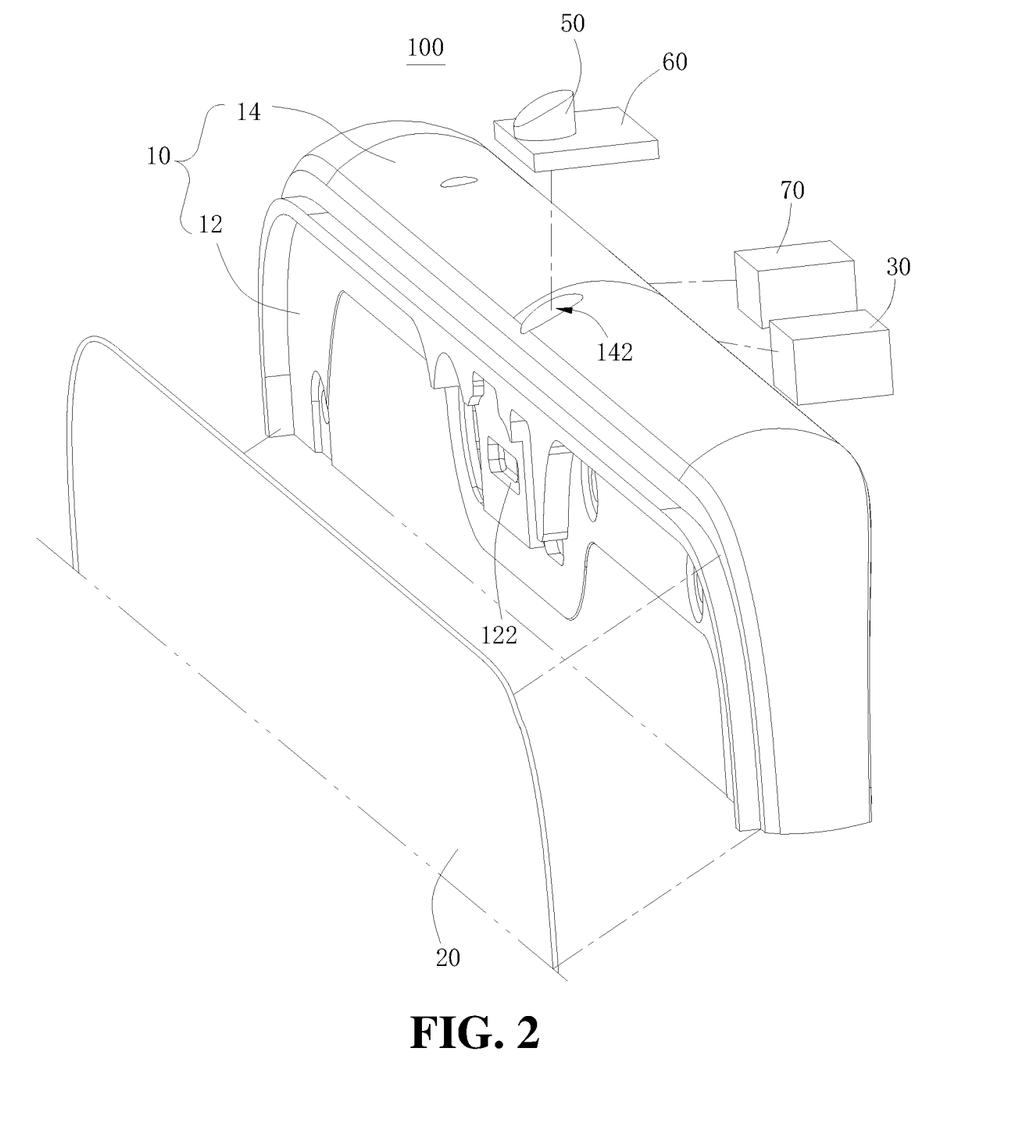
FIG. 2 is an exploded schematic view of an electronic device according to an embodiment of the present disclosure.

As shown in FIGS. 1-2, an electronic device 100 according to the embodiment of the present disclosure includes a housing 10, a touch display 20, and a proximity sensor 30.

Figure 3:
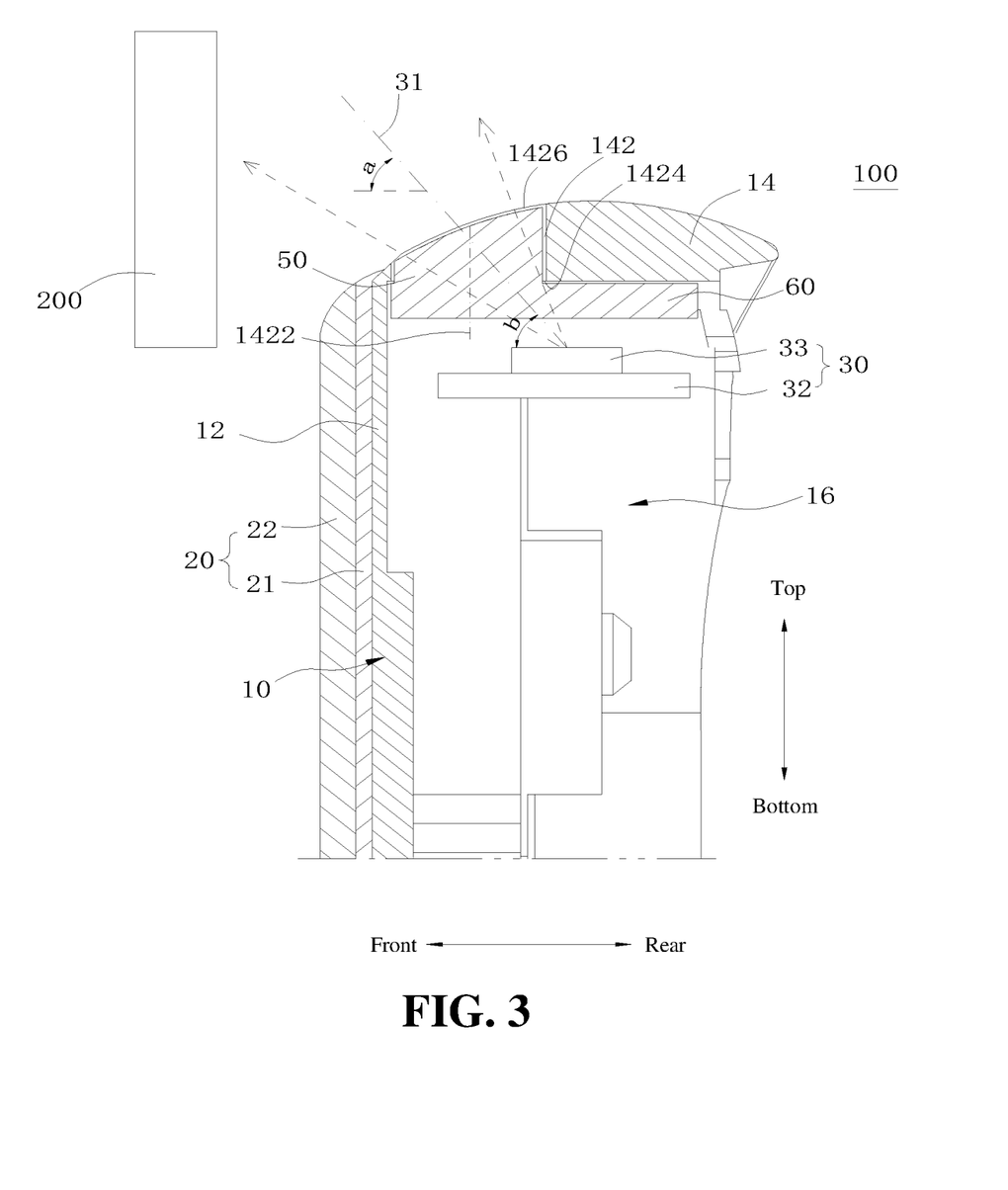
FIG. 3 is a schematic cross-sectional view of the electronic device shown in FIG. 1 along an III-III direction.

As shown in FIG. 3, the housing 10 includes a substrate 12 and a surrounding wall 14 extending rearwardly from an edge of the substrate 12. The substrate 12 and the surrounding wall 14 define a receiving space 16 cooperatively. The surrounding wall 14 defines a light through hole 142 that communicates with the receiving space 16. The touch display 20 is disposed on a front side of the substrate 12. The proximity sensor 30 is provided in the receiving space 16. The proximity sensor 30 includes an infrared emitter 33 and an infrared receiver 34. The infrared emitter 33 is configured to emit infrared light to the front side of the substrate 12 through the light through hole 142. The infrared receiver 34 is configured to receive infrared light emitted by the infrared emitter 33 and reflected back by an external object.

In the electronic device 100 according to the embodiment of the present disclosure, the proximity sensor 30 emits infrared light to the front side of the substrate 12 through the light through hole 142 arranged in the surrounding wall 14 and receives infrared light reflected by the object. The electronic device 100 may control a display state of the touch display 20 according to a signal of the proximity sensor 30. The proximity sensor 30 is covered by the touch display 20, such that the front space of the substrate 12 may not be occupied. In this way, an interference between the proximity sensor 30 and the touch display 20 may be limited, and a screen ratio of the electronic device 100 may be increased.

Exemplarily, the electronic device 100 may be any of various types of computer system device that is mobile or portable and performs wireless communication (only one form is shown in FIG. 1). Specifically, the electronic device 100 may be a mobile phone or a smart phone (e.g., iPhone™-based phone, Android™-based phone), a portable gaming device (e.g. Nintendo DS™, PlayStation Portable™, Gameboy Advance™, iPhone™), a laptop computer, a PDA, a portable Internet device, a music player and a data storage device, other handheld devices, such as a watch, an in-ear headset, a pendant, a headphone, etc. The electronic device 100 may also be other wearable devices (for example, head-mounted devices (HMD) such as an electronic glass, an electronic cloth, an electronic bracelet, an electronic necklace, an electronic tattoo, an electronic device, or a smart watch).

The electronic device 100 may also be any one of a plurality of electronic devices. The plurality of electronic devices include, but are not limited to, a cellular phone, a smart phone, other wireless communication devices, a personal digital assistant, an audio player, other media players, a music recorder, a video recorder, a camera, other media recorders, a radio, a medical device, a vehicle transportation device, a calculator, a programmable remote control, a pager, a laptop computer, a desktop computer, a printer, a netbook computer, a personal digital assistant (PDA), a portable multimedia player (PMP), a moving picture experts group (MPEG-1 or MPEG-2) audio layer 3 (MP3) player, a portable medical device, and a digital camera and combinations thereof.

In some cases, the electronic device 100 may perform multiple functions (such as, playing music, displaying video, storing pictures, and receiving and sending phone calls). If desired, the electronic device 100 may be a portable device such as a cellular phone, a media player, other handheld devices, a wristwatch device, a pendant device, a handset device, or other compact portable devices.

The housing 10 has a substantial rectangular parallelepiped shape. The housing 10 is a carrier of the electronic device 100 and is configured to carry most parts of the electronic device 100. The housing 10 may be made of plastic or metal material. Or, the housing 10 may be an integrated structure formed by the plastic and metal through an in-mold injection molding process. In some embodiments, the material of the substrate 12 is metal, and the material of the surrounding wall 14 is plastic.

A manufacturing method of the housing 10 includes: putting the substrate 12 into a mold, injecting molten plastic into the mold, and forming the surrounding wall 14 after the plastic is cured, thereby obtaining the housing 10.

The touch display 20 may include a display 21 and a cover plate 22 that covers the display 21. The display 21 is, for example, a flexible display such as an organic light-emitting diode (OLED). Of course, the display 21 may also be a liquid crystal display (LCD). The cover plate 22 covers the display 21 to reduce an impact of the display from the outside. The touch display 20 may be fixed on a front side of the substrate 12 by an adhesive.

The touch display 20 can receive an external touch input, thereby generating a corresponding signal, such that the touch display 20 may run in different states. For example, when the touch display 20 is playing video content, in response to the touch display 20 receiving a click input, the touch display 20 may pause the video playback.

After the infrared emitter 33 emits infrared light to the front side of the substrate 12, when the infrared light reaches the object 200 on the front side of the substrate 12, the infrared light will be reflected by the object 200, and the reflected infrared light is transmitted from the light through hole 142 to the infrared receiver 34. The infrared receiver 34 generates the corresponding electric signal according to the acquired infrared light. The electronic device 100 may thus calculate the distance between the proximity sensor 30 and the object 200 according to the time difference between the infrared light emitted by the infrared emitter 33 and the received infrared light, and then control the display state of the touch display 20 according to the time difference.

For example, when the object 200 approaches the touch display 20, the touch display 20 may be controlled to be in an off state. The "off state" herein means that the touch display 20 is powered off and does not display content.

In the embodiments of the present disclosure, the light emitted and received by the proximity sensor 30 is located outside the cover plate 22. In other words, the light emitted and received by the proximity sensor 30 does not pass through the cover plate 22.

As shown in FIG. 1, the electronic device 100 includes a processor 40 configured to control a display state of the touch display 20 according to infrared light received by the infrared receiver 34. In an example, when a user answers or makes a call and places the electronic device 100 near the head, the processor 40 calculates the time when the proximity sensor 30 emits infrared light and receives the infrared light reflected by the object 200 to generate a detection information. The processor 40 turns off the touch display 20 according to the detection information. When the electronic device 100 is far away from the head, the processor 40 turns on the touch display 20 again according to the detection information fed back by the proximity sensor 30.

In the embodiments, the proximity sensor 30 may be fixed on the substrate 12 through a component such as a bracket, or the proximity sensor 30 may be fixed on other components of the electronic device 100.

The light through hole 142 is, for example, a straight hole. Or to say, an inner surface of the light through hole 142 is linear in the axial direction of the light through hole 142. Of course, in the axial direction of the light through hole 142, the inner surface of the light through hole 142 may also be a curve type or a polygonal line type. The infrared light emitted by the proximity sensor 30 can pass through the light through hole 142 and be emitted to the front side of the touch display 20.

As shown in FIG. 3, in an example, the axis 1422 of the light through hole 142 may be vertically arranged. It should be noted that although the axis 1422 of the light through hole 142 is vertically arranged, the infrared light emitted by the infrared emitter 33 can be transmitted to the front side of the touch display 20 because the infrared light emitted by the infrared emitter 33 is inclined. In this way, whether there is an object covering the touch display 20 on the front side of the touch display 20 may be detected.

Figure 4:
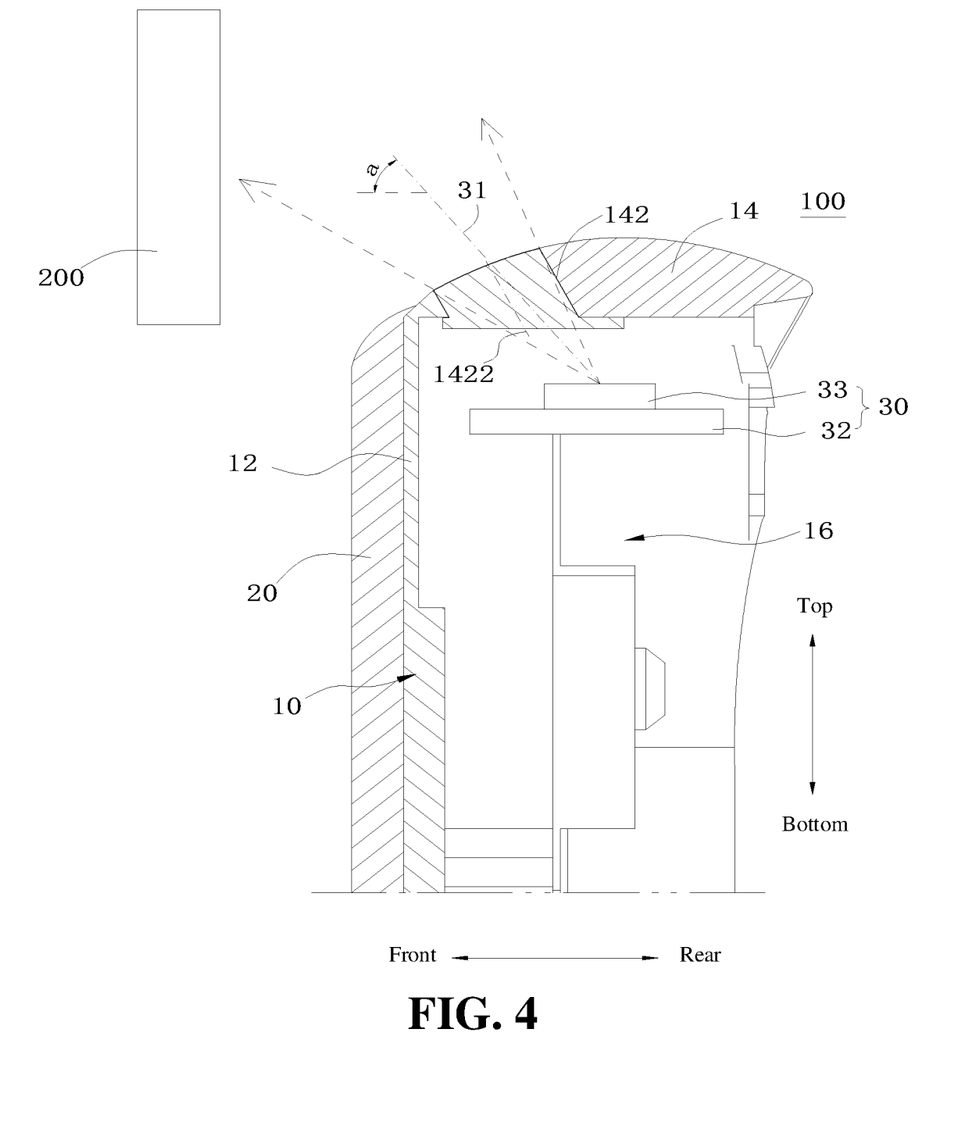
FIG. 4 is another schematic cross-sectional view of an electronic device according to an embodiment of the present disclosure.

Of course, in another example, in a direction from the side of the light through hole 142 near the proximity sensor 30 toward the side of the light through hole 142 away from the proximity sensor 30, the axis 1422 of the light through hole 142 is inclined toward the front side of the substrate 12, as shown in FIG. 4. In this way, the infrared light emitted by the infrared emitter 33 is more easily transmitted to the front side of the touch display 20 after passing through the light through hole 142.

In the embodiments, the light through hole 142 is located at a top position of the surrounding wall 14. That is, the light through hole 142 is located on the top of the electronic device 100. The "top" referred to here is: when the electronic device 100 is in an upright normal use state, the electronic device 100 is located at an end far from the ground. In other words, the "top" is an end portion of one side of the electronic device 100 in the longitudinal direction. Of course, the light through hole 142 may be located at other positions of the surrounding wall 14. For example, the light through hole 142 may be located at the bottom or side of the surrounding wall 14.

It should be noted that, in the embodiments, the "front side" is a side to which the infrared light generated by the touch display 20 is emitted outside the electronic device 100. For example, when the user watches the content displayed on the touch display 20, the side of the touch display 20 facing the user is the front side. Conversely, a side opposite to the front side is a rear side.

It should be noted that the infrared light emitted by the infrared emitter 33 does not pass through the substrate 12 and thus does not pass through the touch display 20. The infrared light emitted by the infrared emitter 33 forms an acute angle with the thickness direction (horizontal direction in FIG. 3) of the touch display 20, such that the infrared light can be emitted to the front side of the substrate 12. The proximity sensor 30 is disposed in the receiving space 16, that is, the proximity sensor 30 is disposed in the housing 10.

The infrared emitter 33 has an emission optical axis 31. As shown in FIG. 3, in some embodiments, an emission optical axis 31 of the infrared emitter 33 passes through the light through hole 142, and the emission optical axis 31 of the infrared emitter 33 is inclined from the infrared emitter 33 to the front side of the substrate 12. It is to be understood that the emission optical axis 31 is a central axis of a radiation range of emitted infrared light.

The emission optical axis 31 of the infrared emitter 33 is inclined toward the front side of the substrate 12, such that the angle between the infrared light emitted by the infrared emitter 33 and the horizontal direction is smaller, and the infrared light emitted by the infrared emitter 33 may be transmitted to the object 200 in front of the touch display 20 is touched to detect whether the object 200 approaches the touch display 20.

It can be understood that the infrared light emitted by the infrared emitter 33 has a certain emission angle. The emission angle of the infrared emitter 33 is an angle between the infrared light emitted by the infrared emitter 33 and the emission optical axis 31. The emission optical axis 31 of the infrared emitter 33 passes through a middle portion of the second opening 1426, such that the infrared light emitted by the infrared emitter 33 may be emitted from an edge of the second opening 1426 to the front side of the substrate 12.

The emission optical axis 31 of the infrared emitter 33 may coincide with the central axis of the infrared light emitted by the infrared emitter 33. The infrared light emitted by the proximity sensor 30 is distributed around the emission optical axis 31 of the infrared emitter 33.

Specifically, the light through hole 142 includes a first opening 1424 and a second opening 1426. The first opening 1424 is close to the proximity sensor 30. The second opening 1426 is remote from the proximity sensor 30. The emission optical axis 31 of the infrared emitter 33 passes through a middle position of the second opening 1426.

As shown in FIG. 3, in some embodiments, an angle α between the emission optical axis 31 of the infrared emitter 33 and the horizontal direction is 30-60 degrees. For example, the angle α may be an angle such as 30 degrees, 35 degrees, 40 degrees, 50 degrees, and 60 degrees. When the angle α is in the above angle range, more infrared light emitted by the infrared emitter 33 may be emitted from the light through hole 142 to the front side of the touch display 20 to detect whether the object 200 covers the touch display 20.

It can be understood that the infrared light emitted by the infrared emitter 33 has a certain emission angle. Therefore, with the emission optical axis 31 of the infrared emitter 33 as a boundary, the angle between the infrared light near the front side of the substrate 12 and the horizontal direction is smaller than the angle α, and the angle between the infrared light far from the front side of the substrate 12 and the horizontal direction is larger than the angle α. For example, when the angle α is 45 degrees, the angle between the infrared light near the front side of the substrate 12 and the horizontal direction is 35 degrees, and the angle between the infrared light far from the front side of the substrate 12 and the horizontal direction is 60 degrees.

It should be noted that the horizontal direction referred to in the present disclosure is the thickness direction of the touch display 20, that is, the angle α between the emission optical axis 31 of the infrared emitter 33 and the thickness direction of the touch display 20 is 30-60 degrees.

Figure 7:
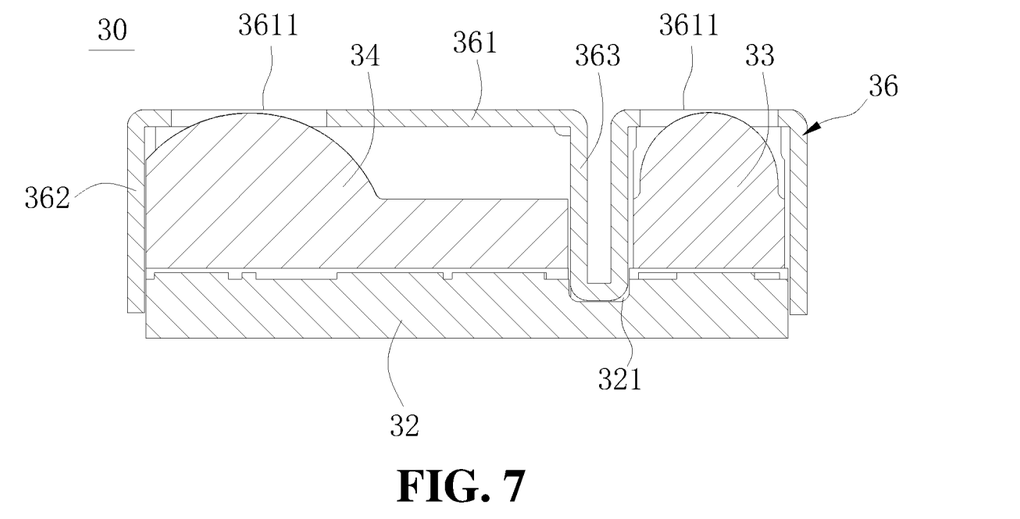
FIG. 7 is a schematic cross-sectional view of a proximity sensor according to an embodiment of the present disclosure.
Figure 8:
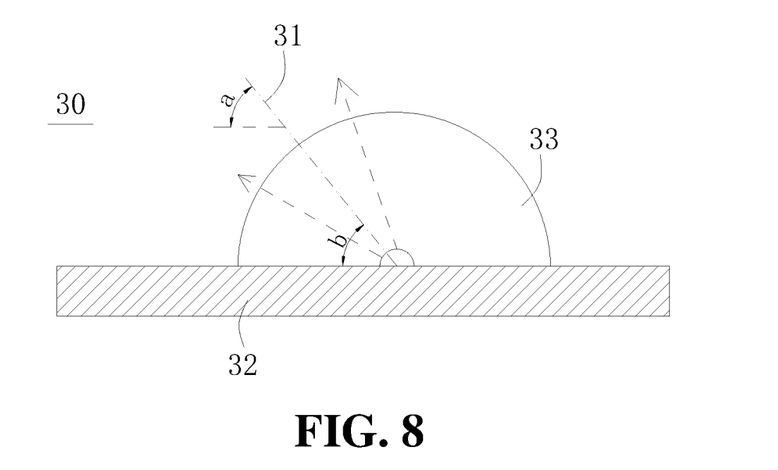
FIG. 8 is another schematic cross-sectional view of a proximity sensor according to an embodiment of the present disclosure.

As shown in FIG. 3, FIG. 7 and FIG. 8, in some embodiments, the proximity sensor 30 further includes a circuit board 32 disposed horizontally. Both the infrared emitter 33 and the infrared receiver 34 are arranged on the circuit board 32. The emission optical axis 31 of the infrared emitter 33 is inclined relative to the circuit board 32 such that the emission optical axis 31 of the infrared emitter 33 is inclined toward the front side of the substrate 12.

The circuit board 32 is arranged horizontally, and the emission optical axis 31 of the infrared emitter 33 is inclined relative to the circuit board 32, such that the emission optical axis 31 of the infrared emitter 33 is inclined relative to the horizontal direction. In this way, after the emission optical axis 31 of the infrared emitter 33 passes through the light through hole 142, the emission optical axis 31 may be inclined toward the front side of the substrate 12, such that the infrared light emitted by the infrared emitter 33 may be incident on the front side of the touch display 20.

The inclined arrangement of the emission optical axis 31 of the infrared emitter 33 relative to the circuit board 32 means that: the emission optical axis 31 of the infrared emitter 33 is not perpendicular to the circuit board 32, and an angle b between the emission optical axis 31 of the infrared emitter 33 and the surface of the circuit board 32 is an acute angle.

In other words, the angle b between the emission optical axis 31 of the infrared emitter 33 and the circuit board 32 is less than 90 degrees. In an example, the angle b between the emission optical axis 31 of the infrared emitter 33 and the circuit board 32 is 30-60 degrees. For example, the angle b is an angle such as 30 degrees, 35 degrees, 45 degrees, 50 degrees, or 60 degrees. It can be understood that when the circuit board 32 is disposed horizontally, the angle a and the angle b are the same.

Specifically, the circuit board 32 is, for example, a printed circuit board (PCB). The horizontal arrangement of the circuit board 32 means that an upper surface of the circuit board 32 is horizontal. Or to say, the thickness direction of the circuit board 32 is in a vertical status.

Figure 5:
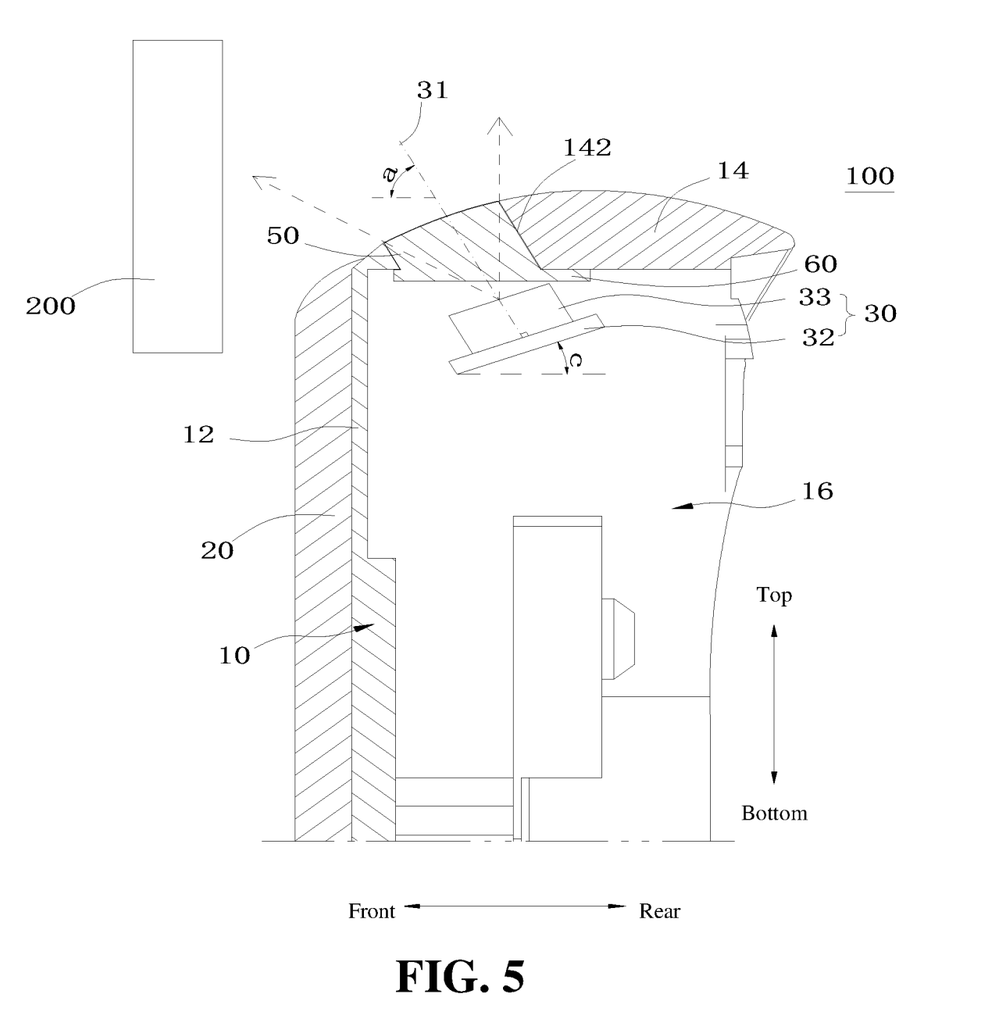
FIG. 5 is further another schematic cross-sectional view of an electronic device according to an embodiment of the present disclosure.

As shown in FIG. 5, in some embodiments, the circuit board 32 of the proximity sensor 30 is disposed obliquely relative to the horizontal direction. Both the infrared emitter 33 and the infrared receiver 34 are arranged on the circuit board 32. The infrared emitter 33 is configured to emit infrared light, the infrared receiver 34 is configured to receive infrared light, and the emission optical axis 31 of the infrared emitter 33 is vertically disposed relative to the circuit board 32 such that the emission optical axis 31 of the infrared emitter 33 is inclined to the front side of the substrate 12.

The circuit board 32 is disposed obliquely relative to the horizontal direction, and the emission optical axis 31 of the infrared emitter 33 is disposed perpendicularly relative to the circuit board 32, such that the emission optical axis 31 of the infrared emitter 33 is disposed obliquely relative to the horizontal direction. In this way, after the emission optical axis 31 of the infrared emitter 33 passes through the light through hole 142, the emission optical axis 31 may be inclined toward the front side of the substrate 12, such that the infrared light emitted by the infrared emitter 33 may be incident on the front side of the touch display 20.

It can be understood that although the emission optical axis 31 of the infrared emitter 33 is perpendicular to the circuit board 32, since the infrared light emitted by the infrared emitter 33 has a certain emission angle, the infrared light emitted by the infrared emitter 33 may be inclined relative to the circuit board 32.

Figure 9:
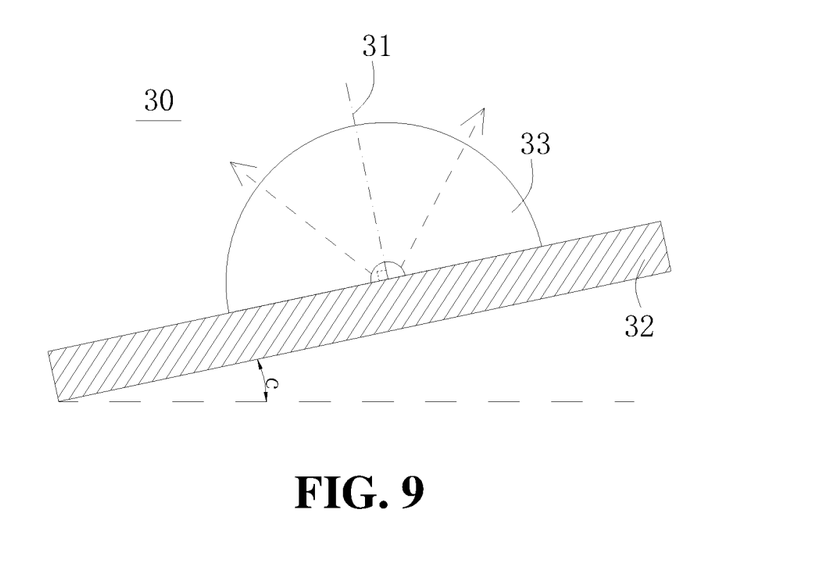
FIG. 9 is further another schematic cross-sectional view of a proximity sensor according to an embodiment of the present disclosure.

As shown in FIGS. 5 and 9, in an example, an angle c of the circuit board 32 inclined relative to the horizontal direction is 30-60 degrees. For example, the angle c is an angle such as 30 degrees, 35 degrees, 45 degrees, 50 degrees, or 60 degrees.

Figure 10:
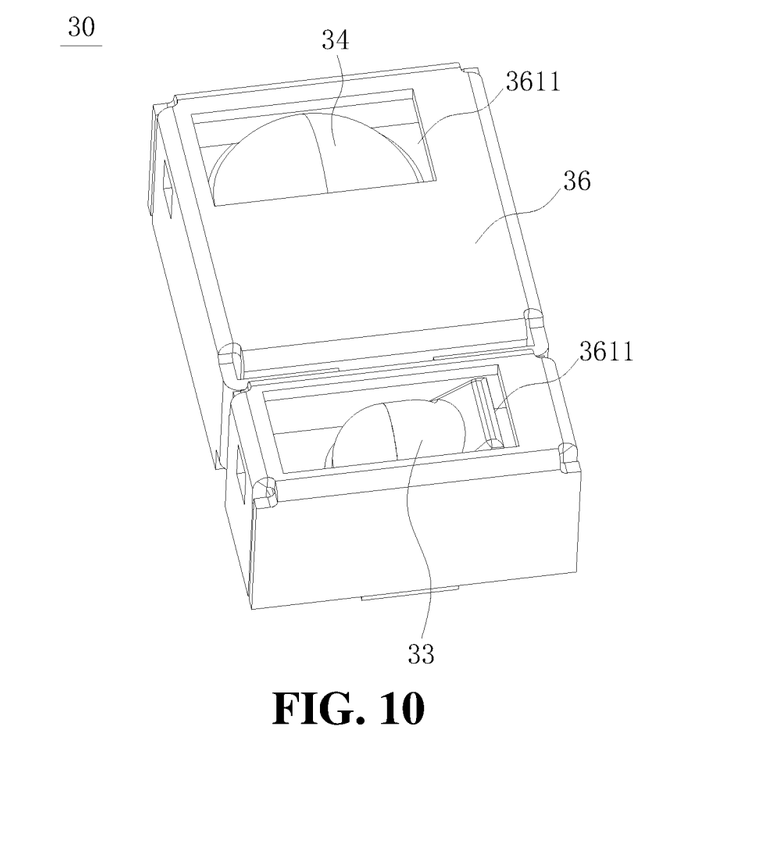
FIG. 10 is a schematic perspective view of a proximity sensor according to an embodiment of the present disclosure.
Figure 11:
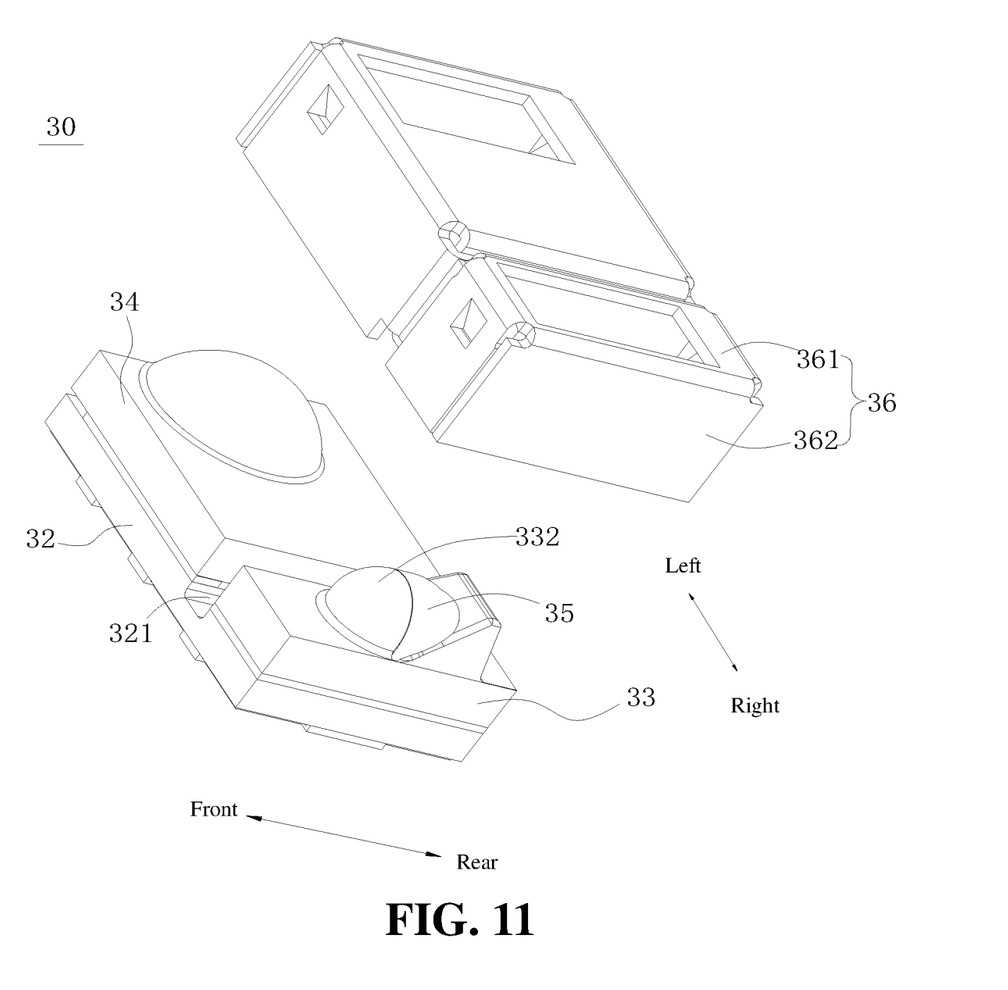
FIG. 11 is an exploded schematic view of a proximity sensor according to an embodiment of the present disclosure.
Figure 12:
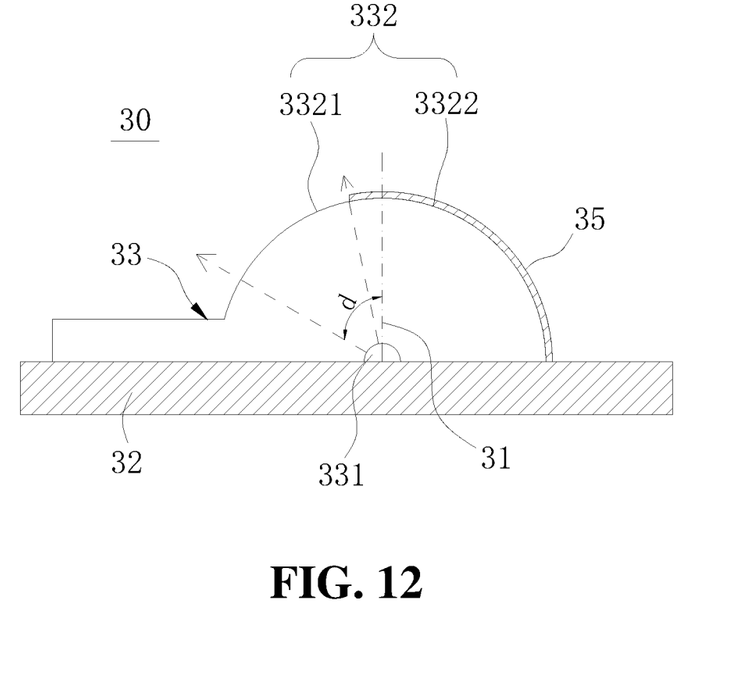
FIG. 12 is a schematic cross-sectional view of a proximity sensor according to an embodiment of the present disclosure.

As shown in FIGS. 10-12, the infrared emitter 33 includes a light emitting source 331 and a light transmitting element 332. The light emitting source 331 having an emission optical axis 31 is arranged on the circuit board 32. The light transmitting element 332 covers the light emitting source 331. The light transmitting element 332 may include a front light transmitting portion 3321 and a rear light transmitting portion 3322 connected to the front light transmitting portion 3321. The front light transmitting portion 3321 is located on the front side of the emission optical axis 31 of the light emitting source 331. The rear light transmitting portion 3322 is located on the rear side of the emission optical axis 31 of the light emitting source 331. The infrared receiver 34 is located on a side of the light emitting source 331. The proximity sensor 30 further includes a light shielding element 35 that covers at least a part of the rear light transmitting portion 3322.

In this way, the light shielding element 35 blocks at least a part of the rear light transmitting portion 3322, such that the infrared light emitted from the front light transmitting portion 3321 may be more concentrated, the energy of the infrared light emitted from the front light transmitting portion 3321 is increased, and the infrared light travels longer distances. Moreover, the above solution is also beneficial for the infrared light to reach the object 200 and be reflected back to the infrared receiver 34, thereby improving the detection capability of the proximity sensor 30.

Specifically, the light transmitting element 332 may be made of a light transmitting material. For example, the material of the light transmitting element 332 is resin or glass. The light transmitting element 332 covers the light emitting source 331, or in other words, the light emitting source 331 is disposed in the light transmitting element 332. In this way, the light transmitting element 332 may protect the light emitting source 331 and problems such as damage to the light emitting source 331 due to contact with oxygen may not occur.

It should be noted that the "front side" referred to in the "front side of the emission optical axis 31" coincides with the direction of the "front side" referred to in the "front side of the substrate 12" described above. Therefore, the infrared light emitted by the light emitting source 331 may reach the front side of the touch display 20 after passing through the front light emitting portion and the light through hole 142 to detect whether the touch display 20 is blocked.

It should be noted that the light shielding element 35 extends from a left side to a right side of the rear light transmitting portion 3322. That is, both the left rear portion and the right rear portion of the rear light transmitting portion 3322 are covered. The light shielding element 35 is, for example, an element that blocks infrared light, such as a foam, a black ink layer, or a metal layer.

When the proximity sensor 30 is arranged with the light shielding element 35, the emission optical axis 31 of the infrared emitter 33 may be perpendicular to the circuit board 32 or may be disposed obliquely to the circuit board 32. The circuit board 32 may be disposed obliquely relative to the horizontal direction, or may be disposed horizontally.

Figure 6:
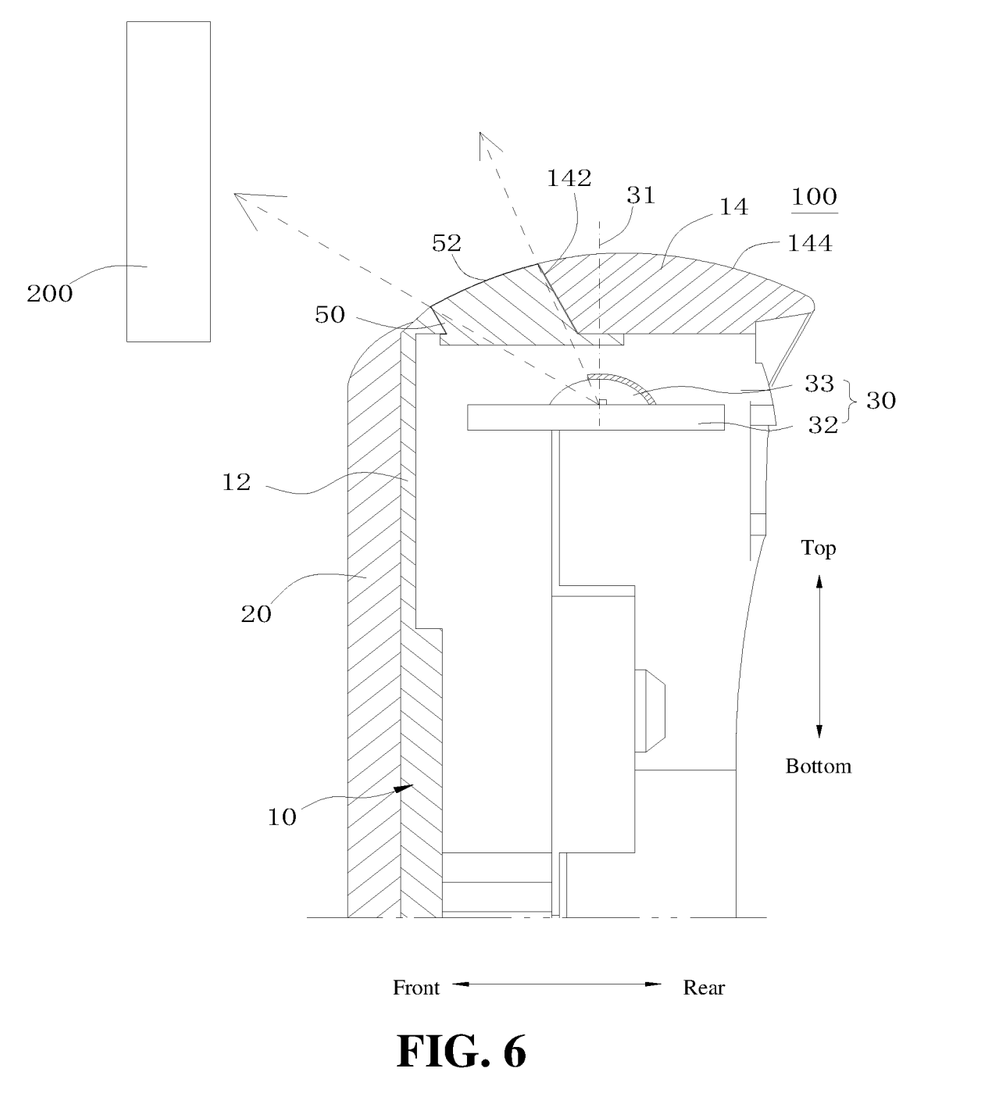
FIG. 6 is further another schematic cross-sectional view of an electronic device according to an embodiment of the present disclosure.

As shown in FIG. 6, in some embodiments, the front light transmitting portion 3321 is disposed near the touch display 20. The rear light transmitting portion 3322 is disposed away from the touch display 20. The light emitting source 331 is configured to emit infrared light to the front side of the substrate 12 through the front light transmitting portion 3321 and the light through hole 142.

In this way, the proximity sensor 30 may work normally to detect whether the object 200 is blocked by the front side of the touch display 20.

As shown in FIG. 6, the emission optical axis 31 of the infrared emitter 33 is perpendicular to the circuit board 32, and the circuit board 32 is disposed horizontally. In this case, the infrared light emitted by the infrared emitter 33 is emitted from the front light transmitting portion 3321 of the light transmitting element 332, and passes through the light through hole 142 to the front side of the touch display 20.

As shown in FIG. 12, in some embodiments, the light shielding element 35 covers the entire rear light transmitting portion 3322. In other words, the light shielding element 35 completely covers the rear light transmitting portion 3322. In this case, the infrared light emitted by the light emitting source 331 is emitted from the front light transmitting portion 3321, such that the energy of the emitted light is more concentrated.

Further, the emission optical axis 31 of the light emitting source 331 is perpendicular to the circuit board 32. The light shielding element 35 covers a part of the front light transmitting portion 3321 near the emission optical axis 31 of the light emitting source 331. That is, a part of the front light transmitting portion 3321 near the emission optical axis 31 is shielded by the light shielding element 35, and infrared light emitted from the light emitting source 331 is emitted from a part far from the emission optical axis 31.

The optical axis of the light emitting source 331 passes through the light shielding element 35. The light emitting source 331 emits infrared light obliquely from the front light transmitting portion 3321 to the outside of the light transmitting element 332 and passes through the light through hole 142 to the front side of the substrate 12 to detect whether the object 200 covers the touch display 20.

Of course, in some embodiments, the light shielding element 35 may cover a part of the rear light transmitting portion 3322.

As shown in FIG. 12, in some embodiments, an angle d between the infrared light emitted from the front light transmitting portion 3321 and the emission optical axis 31 of the light emitting source 331 is 30-60 degrees. In other words, the emission angle of the infrared emitter 33 is 30-60 degrees. For example, the angle d is a specific angle such as 30 degrees, 35 degrees, 40 degrees, 45 degrees, 50 degrees, or 60 degrees.

When the circuit board 32 is arranged horizontally, the angle between the infrared light emitted by the light emitting source 331 and the horizontal direction is also 30-60 degrees, such that the infrared light emitted by the light emitting source 331 may be incident on the front side of the touch display 20.

As shown in FIGS. 7, 10 and 11, in some embodiments, the proximity sensor 30 includes a cover 36 coving the infrared emitter 33 and the infrared receiver 34. The cover 36 includes a top plate 361 and a side plate 362 extending from an edge of the top plate 361. The side plate 362 surrounds the infrared emitter 33 and the infrared receiver 34. The top plate 361 defines a through hole 3611 through which the infrared emitter 33 and the infrared receiver 34 are exposed.

In this way, the cover 36 can protect the infrared emitter 33 and the infrared receiver 34, thereby improving the life of the proximity sensor 30. The cover 36 may be supported by a material having a relatively high rigidity. For example, the material of the cover 36 is metal, and specifically, the material of the cover 36 may be stainless steel. The cover 36 may be formed into the top plate 361 and the side plate 362 by a stamping process, thereby forming the cover 36.

As shown in FIGS. 7, 10 and 11, in some embodiments, the cover 36 further includes a light blocking plate 363. The light blocking plate 363 is connected to the top plate 361 and isolates the infrared emitter 33 and the infrared receiver 34. In this way, the light blocking plate 363 may prevent the infrared light emitted by the infrared emitter 33 from directly transmitting to the infrared receiver 34, such that a normal operation of the infrared receiver 34 may be ensured.

It can be understood that when the infrared light emitted by the infrared emitter 33 is directly transmitted to the infrared receiver 34, the infrared receiver 34 generates a signal representing that the front side of the touch display 20 is blocked, such that the processor 40 incorrectly controls the display status of the touch display 20.

The material of the light blocking plate 363 is a light shielding material. The light blocking plate 363 may be integrated with the top plate 361. In other words, the top plate 361, the light blocking plate 363, and the side plate 362 may be formed by a stamping and bending process.

As shown in FIGS. 7, 10 and 11, in some embodiments, the circuit board 32 defines a groove 321. An end of the light blocking plate 363 away from the top plate 361 is inserted into the groove 321. In this way, the groove 321 may position the cover 36 via the light blocking plate 363, and ensure the cover 36 to be mounted on the circuit board 32 more stable, thereby improving the stability of the proximity sensor 30. Specifically, an outer edge of the groove 321 forms a strip shape. The groove 321 may cooperate with the light blocking plate 363. The size of the groove 321 is slightly larger than that of the light blocking plate 363 such that the light blocking plate 363 may be inserted into the groove 321.

As shown in FIG. 2 and FIG. 3, in some embodiments, the electronic device 100 includes a light guide 50 filled in the light through hole 142. In this way, the infrared light may be better incident to the front side of the substrate 12, and foreign matter such as dust, liquid and the like may not enter the electronic device 100 and damage the electronic device 100. It can be understood that the light guide 50 is made of a light-transmitting material. For example, the material of the light guide 50 is made of a material such as silica gel or resin.

The light guide 50 and the housing 10 may be a separate molded structure. For example, after the housing 10 and the light guide 50 are separately formed, the light guide 50 is inserted into the light through hole 142. A slight gap is thus defined between the light through hole 142 and the light guide 50. Of course, the light guide 50 and the housing 10 may be an integrally formed structure. For example, after the light through hole 142 is defined in the surrounding wall 14, a molten light guide material is injected into the light through hole 142. After the light guide material has solidified, the light guide 50 is formed integrated with the surrounding wall 14. The light guide 50 and the surrounding wall 14 are difficult to separate.

As shown in FIG. 6, in some embodiments, the surrounding wall 14 includes an outer side surface 144. The light guide 50 includes a top surface 52 facing the outer side of the housing 10. The top surface 52 and the outer side surface 144 are smoothly and transitionally docked, which improves the aesthetics of the electronic device 100. The smooth and transitional docking refers to that the height difference formed at the abutment between the top surface 52 and the outer side surface 144 is very small, or the height difference is zero.

As shown in FIG. 3, in some embodiments, the light through hole 142 includes a first opening 1424 and a second opening 1426. The first opening 1424 is close to the proximity sensor 30, and the second opening 1426 is far from the proximity sensor 30. The electronic device 100 further includes a light transmitting body 60 that covers and seals the first opening 1424.

In this way, due to the arrangement of the light transmitting body 60, the infrared light emitted by the infrared emitter 33 may pass into the light through hole 142, and foreign objects from the outside may not enter the electronic device 100 to damage the electronic device 100.

In an example, the light transmitting body 60 is in the shape of a sheet. The light transmitting body 60 may be arranged on an inner side of the surrounding wall 14 by an adhesive. Since the adhesive has a sealing effect, the light transmitting body 60 may seal the second opening 1426.

As shown in FIG. 2, in some embodiments, the light transmitting body 60 and the light guide 50 are integrally formed. For example, the materials of the light transmitting body 60 and the light guide 50 are both resin. In this way, the integrated light transmitting body 60 and the light guide 50 may be formed by in-mold casting. In an example, an assembling process of the light guide 50 includes: the light guide 50 extending from the housing 10 into the light through hole 142, such that the light transmitting body 60 abuts against the inner side of the surrounding wall 14.

As shown in FIG. 2 and FIG. 3, in some embodiments, the electronic device 100 further includes an electro-acoustic element 70. The electro-acoustic element 70 is disposed adjacent to the proximity sensor 30. The substrate 12 has an acoustic channel 122 through which the electro-acoustic element 70 emits sound toward the front side of the substrate 12.

The electro-acoustic element 70 is, for example, a receiver. The electro-acoustic element 70 emits a sound when the electronic device 100 is in a call service. In this way, when the electronic device 100 is in the call service, in response to a user bringing the electro-acoustic element 70 close to ears, the proximity sensor 30 may detect that the object 200 covers the touch display 20, and the processor 40 controls the touch display 20 to be in the off state.

In summary, the proximity sensor 30 according to the embodiment of the present disclosure includes the circuit board 32, the infrared emitter 33, the infrared receiver 34, and the light shielding element 35. The infrared emitter 33 includes the light emitting source 331 and the light transmitting element 332. The light emitting source 331 is arranged on the circuit board 32. The light transmitting element 332 covers the light emitting source 331. The light transmitting element 332 includes the front light transmitting portion 3321 and the rear light transmitting portion 3322 connected to the front light transmitting portion 3321. The front light transmitting portion 3321 is located on the front side of the emission optical axis 31 of the light emitting source 331. The rear light transmitting portion 3322 is located on the rear side of the emission optical axis 31 of the light emitting source 331. The infrared receiver 34 is located on a side of the light emitting source 331. The light shielding element 35 covers at least a part of the rear light transmitting portion 3322.

In the description of the present specification, descriptions with reference to the terms "an embodiment", "some embodiments", "exemplary embodiments", "examples", "specific examples", or "some examples" and the like mean that a combination with specific features, structures, materials, or characteristics described in the embodiments or examples are included in at least one embodiment or example of the present disclosure. In this specification, the schematic expressions of the above terms do not necessarily refer to a same embodiment or example. Moreover, the particular features, structures, materials, or characteristics described may be combined in any suitable manner in any one or more embodiments or examples.

Although the embodiments of the present disclosure have been shown and described, those skilled in the art can understand that various changes, modifications, replacements and variations can be made to these embodiments without departing from the principles and spirit of the present disclosure. The scope of the disclosure is defined by the claims and their equivalents.

What is claimed is:

1. A proximity sensor, comprising:
a circuit board;
an infrared emitter and an infrared receiver, both arranged on the circuit board, the infrared emitter comprising a light emitting source arranged on the circuit board and a light transmitting element covering the light emitting source, the infrared receiver being arranged on a side of the light emitting source; wherein the light emitting source has an emission optical axis, the light transmitting element comprises a front light transmitting portion and a rear light transmitting portion connected to the front light transmitting portion, the front light transmitting portion being located on a front side of the emission optical axis of the light emitting source, the rear light transmitting portion being located on a rear side of the emission optical axis of the light emitting source; and
a light shielding element covering at least a part of the rear light transmitting portion and comprising a black ink layer.

2. The proximity sensor according to claim 1, wherein the light shielding element covers the rear light transmitting portion entirely.

3. The proximity sensor according to claim 2, wherein the emission optical axis of the light emitting source is perpendicular to the circuit board, and the light shielding element covers a part of the front light transmitting portion close to the emission optical axis of the light emitting source.

4. The proximity sensor according to claim 3, wherein an angle between an infrared light emitted from the front light transmitting portion and the emission optical axis of the light emitting source is substantially 30-60 degrees.

5. The proximity sensor according to claim 1, further comprising a cover covering the infrared emitter and the infrared receiver, the cover comprising a top plate and a side plate extending from an edge of the top plate; wherein the side plate surrounds the infrared emitter and the infrared receiver, and the top plate defines a through hole through which the infrared emitter and the infrared receiver are exposed.

6. The proximity sensor according to claim 5, wherein the cover further comprises a light blocking plate connected to the top plate and isolating the infrared emitter and the infrared receiver.

7. The proximity sensor according to claim 6, wherein the circuit board defines a groove, and an end of the light blocking plate away from the top plate is inserted into the groove.

8. The proximity sensor according to claim 7, wherein an outer edge of the groove is in a substantial strip shape, and the groove cooperates with the light blocking plate.

9. The proximity sensor according to claim 6, wherein the light blocking plate and the top plate are an integrated structure.

10. The proximity sensor according to claim 1, wherein the circuit board is disposed horizontally, and an emission optical axis of the infrared emitter is disposed obliquely relative to the circuit board.

11. The proximity sensor according to claim 1, wherein the light shielding element covers a part of the rear light transmitting portion.

12. The proximity sensor according to claim 1, wherein the light emitting source is received in a space defined by the light transmitting element; the light shielding element extends from a left side to a right side of the rear light transmitting portion.

13. An electronic device, comprising:
a housing; and
a proximity sensor, arranged in the housing;
wherein the proximity sensor comprises:
    a circuit board;
    an infrared emitter and an infrared receiver, both arranged on the circuit board, the infrared emitter comprising a light emitting source arranged on the circuit board and a light transmitting element covering the light emitting source, the infrared receiver being arranged on a side of the light emitting source; wherein the light emitting source has an emission optical axis, the light transmitting element comprises a front light transmitting portion and a rear light transmitting portion connected to the front light transmitting portion, the front light transmitting portion being located on a front side of the emission optical axis of the light emitting source, the rear light transmitting portion being located on a rear side of the emission optical axis of the light emitting source; and
    a light shielding element covering at least a part of the rear light transmitting portion and comprising a black ink layer.

14. The electronic device according to claim 13, wherein the housing comprises a substrate and a surrounding wall extending rearwardly from an edge of the substrate; the substrate and the surrounding wall define a receiving space cooperatively; the surrounding wall defines a light through hole communicating with the receiving space; the proximity sensor is disposed in the receiving space; the electronic device further comprises a touch display covered on a front side of the substrate; and
the front light transmitting portion is disposed close to the touch display; the rear light transmitting portion is disposed away from the touch display; the light emitting source is configured to emit an infrared light to the front side of the substrate through the front light transmitting portion and the light through hole; and the infrared receiver is configured to receive the infrared light from the front side of the substrate.

15. The electronic device according to claim 14, wherein, in a direction from a side of the light through hole near the proximity sensor toward a side of the light through hole away from the proximity sensor, an axis of the light through hole is inclined toward the front side of the substrate.

16. The electronic device according to claim 14, further comprising a light guide filled in the light through hole.

17. The electronic device according to claim 16, wherein the surrounding wall comprises an outer side surface; the light guide comprises a top surface facing an outer side of the housing; and the top surface smoothly transitions to and docks with the outer side surface.

18. The electronic device according to claim 14, wherein the light through hole comprises a first opening near the proximity sensor and a second opening far from the proximity sensor; and the electronic device further comprises a light transmitting body covering and sealing the first opening.

19. The electronic device according to claim 14, further comprising an electro-acoustic element disposed adjacent to the proximity sensor, wherein the substrate is arranged with a sound path through which the electro-acoustic element emits sound toward the front side of the substrate.

20. An electronic device, comprising:
a touch display comprising a display and a cover plate that covers the display; and
a proximity sensor, wherein a light emitted and received by the proximity sensor is located outside the cover plate;
the proximity sensor comprises:
    a circuit board;
    an infrared emitter and an infrared receiver, both arranged on the circuit board, the infrared emitter comprising a light emitting source arranged on the circuit board and a light transmitting element covering the light emitting source, the infrared receiver being arranged on a side of the light emitting source; wherein the light emitting source has an emission optical axis, the light transmitting element comprises a front light transmitting portion disposed close to the touch display, and a rear light transmitting portion disposed away from the touch display and connected to the front light transmitting portion, the front light transmitting portion being located on a front side of the emission optical axis of the light emitting source, the rear light transmitting portion being located on a rear side of the emission optical axis of the light emitting source; and
    a light shielding element covering at least a part of the rear light transmitting portion and comprising a black ink layer.

* * * * *